United States Patent [19]

Jacob

[11] Patent Number: 4,935,212
[45] Date of Patent: Jun. 19, 1990

[54] METHOD OF DECOMPOSING ORGANIC HALOGEN COMPOUNDS IN GASEOUS PHASE

[75] Inventor: Eberhard Jacob, Tutzing, Fed. Rep. of Germany

[73] Assignee: Man Technologie GmbH, Munich, Fed. Rep. of Germany

[21] Appl. No.: 353,951

[22] Filed: May 19, 1989

[30] Foreign Application Priority Data

Dec. 13, 1988 [DE] Fed. Rep. of Germany ....... 3841847

[51] Int. Cl.$^5$ .......................... C01B 9/00; B01D 53/36
[52] U.S. Cl. ...................................... 423/240; 423/481
[58] Field of Search ...................... 423/245.3, 481, 483, 423/240 R, 240 S

[56] References Cited

U.S. PATENT DOCUMENTS 4,423,024  12/1983  Wolford .............................. 423/437

FOREIGN PATENT DOCUMENTS

| 4470 | 1/1977 | Japan | 423/240 |
| 104634 | 8/1980 | Japan | 423/245.3 |
| 1369777 | 1/1988 | U.S.S.R. | 423/245.3 |

Primary Examiner—Jeffrey E. Russel
Assistant Examiner—Brian M. Bolam
Attorney, Agent, or Firm—Ladas & Parry

[57] ABSTRACT

A method of decomposing organic halogen compounds including fluorinated hydrocarbons in the gaseous phase on superacid catalysts comprising titanium dioxide, with the formation of carbon doixide and hydrogen halides and particularly hydrolysis of perhalogenated methane derivatives on a sulfated titanium dioxide catalyst, and hydrolysis and oxidation of organic halogen compounds on a catalyst of sulfated copper oxide and sulfated titanium dioxide. The hydrogen halides liberated by the decomposition of the organic halogen compounds can be easily removed by conventional methods such as scrubbing with water.

10 Claims, No Drawings

METHOD OF DECOMPOSING ORGANIC HALOGEN COMPOUNDS IN GASEOUS PHASE

FIELD OF THE INVENTION

The invention relates to a method of decomposing organic halogen compounds in gaseous phase to carbon dioxide and a hydrogen halide.

BACKGROUND

In the production, processing and use of organic halogen compounds (HHC) and the elimination of HHC-containing products, there are produced waste substances, exhaust air and waste gases which are undesirable in the environment due to their HHC content.

In J. K. Musick, F. W. Williams, Ind. Eng. Chem., Prod. Res. Devel. 13, 1974, 175/9, a method of catalytic decomposition is proposed for the purification of waste gases and exhaust air. M. P. Manning, Hazard, Waste 1, 1984, 41/64 discloses oxidizing chlorinated hydrocarbons (CHC) catalytically on $Cr_2O_3/\delta\text{-}Al_2O_3$. For the special case of the removal of CHC from so-called dump gases (produced in recycle plants of domestic garbage, rubbish and trash), alkaline contact compositions are used (DE 34 47 066).

The disadvantages of the previously known methods for the decomposition of HHC are the following:

None of the catalytic methods known up to the present is able to decompose chlorinated fluorochlorohydrocarbons (FCHC). The previously known catalysts consist of materials (for instance $Al_2O_3$, $SiO_2$, $Cr_2O_3$) which are deactivated by hydrogen fluoride—one of the products of the decomposition of FCHC (DE 25 14 585). The catalytic oxidation of CHC leads to the partial oxidation of hydrogen chloride to chlorine and can thus not be used for the purification of waste gases and waste air since chlorine—in contradistinction to HCl—cannot be removed by simple means (for instance, scrubbing with water). The formation of chlorine generally results in the deactivation of the catalyst and the liberation of injurious substances, such as chromyl chloride and copper chloride (G. Laidig et al., Erdol, Kohle, Erdgas, Petrochem. 34, 1981 329/36, 333/4).

The active components of the catalysts for the catalytic oxidation of CHC are frequently expensive (platinum metals) or toxic (oxides of chromium, nickel, cobalt and molybdenum).

SUMMARY OF THE INVENTION

An object of the present invention is to avoid the above-mentioned disadvantages and to provide a method by which halogen compounds can be decomposed substantially completely and without the development of noxious gases.

This object is achieved in accordance with the invention by contacting a gaseous mixture of an organic halogen compound at an elevated temperature with a catalyst composition which consists essentially of sulfated titanium dioxide having a sulfate content of 0.05 to 10% by weight.

With the catalyst of the invention, it is possible to decompose not only the more easily decomposable HHC hydro-carbons but also fluorine-containing organic halogen compounds the activity of the catalyst composition being retained in the presence of HF, $SO_2$ and $SO_3$.

The catalyst composition, which can be used in any geometrical structure as well as in the form of a layer on a substrate, for instance a honeycomb structure, does not contain any toxic substances and is furthermore favorable in price.

The solution in accordance with the invention includes the use of a hydrolysis catalyst having a base of a super-acidic solid acid (KI. Tanabe in: B. L. Shamiro, Heterogeneous Catalysis 2, 1984, 71/94) for activating the reaction of the HHC compound with water and the splitting off of hydrogen halide (HH). The hydrogen halide formed is removed from the gaseous mixture in known manner, for instance by scrubbing with water.

Depending on the composition of the HHC-substrate, CO, $CO_2$ or an unstable C-containing fragment is produced by the hydrolysis. In the simplest case of a perhalogenated HHC compound having one carbon atom per molecule, $CO_2$, which requires no further after treatment, is liberated. In the case of all the other HHC compounds, CO and/or C-containing fragments which tend to decompose with the separation of carbon are also produced; the addition of hydrogen to the process gas in the presence of an oxidation-catalytic active component serves to convert CO and the C-containing fragments of $CO_2$.

As a hydrolysis catalyst, sulfated titanium dioxide shows a surprisingly high activity. $CF_3Cl$—a compound which is entirely stable in the presence of water at 500° C. and 4000 bar for a period of 12 hours (A. P. Hagen, E. A. Elphingstone, J. Inorg. Nucl. Chem, 36, 1974, 509/11)—is hydrolyzed quantitatively in the presence of sulfated titanium dioxide at 450° C. in a contact time of 0.7 seconds in accordance with the equation

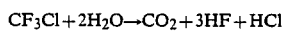

$$CF_3Cl + 2H_2O \rightarrow CO_2 + 3HF + HCl$$

With the same catalyst, the HHC compounds $CF_2Cl_2$, $CFCl_3$, $CCl_4$, $CF_3Br$ and $CF_2ClBr$ can also be hydrolyzed quantitatively at 400° C. in accordance with the equation

$$CX_4 + 2H_2O \rightarrow CO_2 + 4HX \quad (X = F, CL, Br)$$

and the halogen compound $CF_2Cl\text{—}CFCl_2$ in accordance with the equation

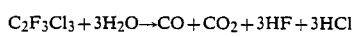

$$C_2F_3Cl_3 + 3H_2O \rightarrow CO + CO_2 + 3HF + 3HCl$$

Since the formation of CO is undesired upon the purification of exhaust air and waste gas, a further feature of the invention comprises the use of a bifunctional hydrolysis/oxidation catalyst consisting of sulfated titanium dioxide with copper oxide, copper sulfate or mixtures thereof and oxyhydrolysis with steam and oxygen, with the formation of $CO_2$ and hydrogen halide. The CuO and/or $CuSO_4$ act here as active components for the oxidation of CO and/or of the carbon fragments which remain after the splitting off of the halogen.

The reaction of $C_2F_3Cl_3$ with hydrogen and atmospheric oxygen takes place quantitatively at 400° C. in accordance with the equation

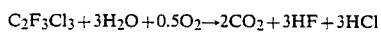

$$C_2F_3Cl_3 + 3H_2O + 0.5O_2 \rightarrow 2CO_2 + 3HF + 3HCl$$

The conversion of perchlorethylene, $C_2Cl_4$, on such a catalyst composition takes place in accordance with the equation

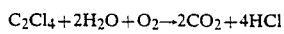

$$C_2Cl_4 + 2H_2O + O_2 \rightarrow 2CO_2 + 4HCl$$

Quantitative conversions with the sulfated titanium dioxide and copper oxide and/or copper sulfate were obtained with the following HHC compounds at 400° C. in accordance with the general equation:

$$C_aH_bX_c + \frac{c-b}{2} H_2O + \left[a + \frac{b-c}{4}\right]O_2 \rightarrow a\,CO_2 +$$

$c\,HX(X = F, Cl, Br)$  $CCl_3H$, $CCl_2H_2$, $CClH_3$, $CF_3H$, $C_2F_5Cl$, $C_2F_4Cl_2$, $C_2F_2Cl_4$, $C_2Cl_3H_3$, $C_2Cl_2H_4$, $C_2Cl_3H$, $C_2Cl_2H_2$, $C_2ClH_3$, $C_6H_4Cl_2$, $C_6F_5Cl$, $C_6F_6$.

Any desired mixtures of different HHC compounds can also be quantitively decomposed by oxyhydrolysis. In the above-mentioned cases, a catalyst with 1% Cu was used. The copper content of the bifunctional sulfated $CuO/TiO_2$ catalyst is adapted to the oxygen demand of the oxyhydrolysis reaction. The higher the oxygen demand, the higher the copper content of the catalyst. For organic halogen compounds $C_aH_bX_c$, wherein X is halogen, when $c \geqq b$, a copper content of 1% by weight is generally sufficient. For $c < b$, a higher copper content is advantageous. In general, the copper content is between 0.05 and 20% by weight and particularly between 0.5 and 5% by weight.

In the oxyhydrolysis of organic halogen compounds $C_aH_bX_c$, the oxygen is present in an amount $(a+b/2+d/z)$ wherein d is the number of carbon bonds.

The oxyhydrolysis of organic halogen compounds is not limited to halogenated hydrocarbons. Organic halogen compounds which contain oxygen, sulfur and/or nitrogen are also decomposed quantitively, as shown by the following examples:

$CF_3-COOH + H_2O + 0.5\,O_2 \rightarrow 2CO_2 + 3HF$ $S(CH_2CH_2Cl)_2 + 6.5\,O_2 \rightarrow SO_2 + 4CO_2 + 3H_2O + 2HCl$ $2N(n-C_4F_9)_3 + 27H_2O + 10.5\,O_2 \rightarrow N_2 + 24CO_2 + 54HF$ One important example of the use of the oxyhydrolysis of HHC mixtures in the trace region is the removal of HHC compounds from dump gas. In the case of dump gas, complete removal of the fluorine content can be obtained with sulfated titanium dioxide; the removal of chlorine is incomplete since, in particular, stable CHC ($C_2Cl_4$, $C_2Cl_3H$) are decomposed only to the extent of 40–70%. Upon the addition of 0.1% of copper oxide or copper sulfate to the catalyst composition, a complete removal of halogen is assured here also.

CHC waste products of any desired composition can also be substantially oxyhydrolyzed after vaporization with steam and air on sulfated titanium dioxide with 4% Cu.

Long term tests of more than 1000 hours did not show any indication of any deactivation of the catalyst described, provided that the temperature does not exceed 550° C. The formation of chlorine was substantially suppressed.

In carrying out the decomposition of the organic halogen compounds, the temperature of the organic halogen compound is between 100° and 600° C. and the contact time with the catalyst composition is between 0.05 and 100 sec. Preferably, the temperature is between 300° and 500° C. and the contact time is between 0.1 and 20 sec.

The catalyst composition has a specific surface of 15° to 180 m²g and preferably 25 to 125 m²/g.

In general, the organic halogen compound has the formula $C_aH_bX_c$.

DETAILED DESCRIPTION

The invention will be described in detail with reference to specific embodiments given in the following examples.

EXAMPLE 1

Titanium dioxide pellets of a purity of 98% and a diameter of 1–2 mm with a specific surface of 70–80 m²/g are impregnated with the calculated quantity of 30% sulfuric acid so that the final catalyst contains 3% by weight of sulphafte, $SO_4^{2-}$. After drying at 105° C., the catalyst is calcined in air for one hour at 500° C.

EXAMPLE 2

The catalyst described in Example 1 was tested with a gas mixture which contained 2000 ppm $CF_3Cl$ and 2% water, the balance being nitrogen. With a contact time ($t_k$) of two seconds, the following residual concentrations of $CF_3Cl$ were determined at the following input temperatures $T_E$ with a gas chromatograph with ECD-detector:

| $T_E$ (°C.) | Residual concentration (ppm) |
|---|---|
| 300 | 1020 |
| 350 | 40 |
| 400 | 5 |
| 450 | <1 |

With an FT-IR spectrometer, 2000 ppm $CO_2$, 6000 ppm HF and 2000 ppm HCl were detected with a $CaF_2$ gas cell behind the catalyst (450° C.).

EXAMPLE 3

The catalyst described in Example 1 was tested with gas mixtures which in each case contained 2000 ppm HHC (referred to $C_1$) and 2% steam, the balance being nitrogen. With a contact time of 2 seconds and an input temperature $T_E=400°$ C., HHC residual concentrations of <1 ppm and $CO_2$ concentrations of 2000 ppm were found. The following HHC compound were examined: $CF_2Cl_2$, $CFCl_3$, $CCl_4$, $CF_2ClBr$, $CF_3Br_2$.

EXAMPLE 4

The catalyst described in Example 1 was tested with a gas mixture which contained 1000 ppm of $CF_2Cl-CFCl_2$, and 2% steam, the balance being nitrogen. With $t_k=2$ seconds and $T_E=450°$ C., there was found a $CF_2Cl-CFCl_2$ residual concentration of <1 ppm and CO and $CO_2$ concentrations of 1000 ppm each.

EXAMPLE 5

The catalyst described in Example 1 was impregnated with an aqueous solution of copper nitrate which contained sufficient copper for the final catalyst to have (a) 1%, (b) 0.1% and (c) 4% Cu.

After drying at 150° C., the catalyst is calcined for one hour in air at 500° C.

EXAMPLE 6

The catalyst described in Example 5a was tested with a gas mixture which contained 1000 ppm $CF_2Cl$—$CFCl_2$ and 2% steam, the balance being dried air. With $t_k=2$ seconds and $T_E=450°$ C., there was found a $CF_2Cl$—$CFCl_2$ residual concentration of $<1$ ppm and a $CO_2$ concentration of 2000 ppm.

EXAMPLE 7

The catalyst described in Example 5a was tested with a gas mixture which contained 1000 ppm perchlorethylene, $C_2Cl_4$ and 2% steam, the balance being dried air. With $t_k=2$ seconds and $T_E=450°$ C., there was found a $C_2Cl_4$ residual concentration of $<1$ ppm and $CO_2$ and HCl concentrations of 2000 and 4000 ppm respectively.

EXAMPLE 8

The catalyst described in Example 5a was tested with a gas mixture which contained 2000 ppm HHC (referred to $C_1$) and 2% steam, the balance being dried air. With $t_k=2$ seconds and $T_E=400°$ C., there was measured a residual HHC concentration of $<1$ ppm and a $CO_2$ concentration of 2000 ppm. The following HHC compounds were examined in this way:

$CCl_3H$, $CCl_2H_2$, $CClH_3$, $CFH_3$, $CF_2ClH$, $C_2F_5Cl$,
$C_2F_4Cl_2$, $C_2F_2Cl_4$, $C_2Cl_3H_3$, $C_2Cl_2H_4$ $CH_3CHF_2$,
$C_2Cl_3H$, $C_2Cl_2H_2$. $C_2ClH_3$, $C_6Cl_2H_4$
(dichlorobenzene isomer), $C_6F_5Cl$
(pentafluorochlorobenzene)$C_6F_6$.

EXAMPLE 9

The catalyst described in Example 5c was tested with a gaseous mixture which contained 500 ppm $S(CH_C$—$CH_2Cl)_2$ and 2% steam, the balance being dried air. With $t_k=2$ seconds and $T_E=400°$ C., there was measured a residual concentration of $S(CH_2$—$CH_2Cl)_2$ of $<0.1$ ppm and concentrations of $CO_2$, $SO_2$ and HCl of 2000, 500 and 1000 ppm respectively.

EXAMPLE 10

The catalyst described in Example 1 was tested with a dump gas which contained methane and $CO_2$ as the main components, 2% steam and 3% hydrogen and a mixture of 21 identified HHC compounds with a total chlorine content of 40 ppm and a total fluorine content of 15 ppm. With $t_k=1$ second and $T_E=400°$ C., the total chlorine content was decreased to 4 ppm and the total fluorine content to $<1$ ppm. With the catalyst described in Example 5b, the total chlorine content was also decreased to $<1$ ppm under th same conditions.

EXAMPLE 11

The catalyst described in Example 5c was tested with a gaseous mixture of a CHC waste product having an average composition of 3% by volume of $CH_{1.69}Cl_{0.72}O_{0.05}$ and 3 to 20% by volume of steam, the balance being air. With $t_k=6$ seconds and $T_E=400°$ C., there was found a CHC residual concentration of $<10$ ppm of total chlorine, 3% by volume of $CO_2$ and 2.2% by volume of HCl.

General observations regarding Examples 1 through 11:

In Examples 2–4 and 6–9, no measurable deactivition of the catalysts in accordance with Example 1 and Examples 51-3 was found after a test period of 100 hours; in the case of Examples 10–11, no measurable deactivation was noted after a time of testing of 1000 hours.

No formation of chlorine by oxidation of HCl could be found in Examples 6–9 by measurement with a mass spectrometer.

While the invention has been disclosed in relation to a number of embodiments thereof, it will become apparent to those skilled in the art that numerous modifications and variations can be made within the scope and spirit of the invention as defined in the attached claims.

What is claimed is:

1. A method of decomposing an organic halogen compound in gaseous phase to carbon dioxide and a hydrogen halide, comprising contacting a gaseous mixture of an organic halogen compound at an elevated temperature between 100° and 600° C. with a catalyst composition which consists essentially of sulfated titanium dioxide having a sulfate content of 0.05 to 10% by weight.

2. A method as claimed in claim 1 wherein said catalyst composition contains in admixture with said sulfated titanium dioxide, copper oxide, copper sulfate or mixtures thereof with a copper content of 0.05 to 20% by weight.

3. A method as claimed in claim 2 wherein the copper content is 0.5 to 5% by weight.

4. A method as claimed in claim 1 wherein the content time is 0.05 to 100 seconds.

5. A method as claimed in claim 4 wherein the temperature is 300° to 500° C.

6. A method as claimed in claim 4 wherein the contact time is 0.1 to 20 sec.

7. A method as claimed in claim 1 wherein the organic halogen compound is $C_a H_b X_c$ wherein X is halogen, the method further comprising mixing the compound with steam in a ratio of at least c/2 moles of steam for c moles of halogen before contact with the catalyst composition.

8. A method as claimed in claim 1 wherein the organic halogen compound is $C_a H_b X_c$ wherein X is halogen, the method further comprising mixing the compound with oxygen before contact with the catalyst composition such that for a moles of carbon and b moles of hydrogen, the oxygen is present in an amount of at least $(a+b/2+d/2)$ moles wherein d is the number of carbon bonds.

9. A method as claimed in claim 1 wherein the catalyst composition has a specific surface of 15 to 180 $m^2/g$.

10. A method as claimed in claim 9 wherein the specific surface of the catalyst composition is 25 to 125 $m^2/g$.

* * * * *